United States Patent
Amagai et al.

(10) Patent No.: US 9,288,386 B2
(45) Date of Patent: Mar. 15, 2016

(54) IMAGING APPARATUS AND IMAGE SYNTHESIZING METHOD

(75) Inventors: Hitoshi Amagai, Hino (JP); Naotaka Uehara, Higashimurayama (JP); Takayuki Kogane, Akishima (JP); Sumito Shinohara, Akiruno (JP); Masato Nunokawa, Fussa (JP); Tetsuya Handa, Fussa (JP); Kimiyasu Mizuno, Akishima (JP); Takehiro Aibara, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 246 days.

(21) Appl. No.: 13/297,486

(22) Filed: Nov. 16, 2011

(65) Prior Publication Data

US 2012/0120273 A1 May 17, 2012

(30) Foreign Application Priority Data

Nov. 16, 2010 (JP) .................. 2010-255460

(51) Int. Cl.
*H04N 5/228* (2006.01)
*H04N 5/232* (2006.01)
*H04N 5/247* (2006.01)

(52) U.S. Cl.
CPC ....... *H04N 5/23219* (2013.01); *H04N 5/23203* (2013.01); *H04N 5/247* (2013.01)

(58) Field of Classification Search
CPC .......... H04N 5/23203; H04N 5/23219; H04N 5/247; H04N 19/00412; G06T 11/60
USPC ..................................................... 348/222.1
See application file for complete search history.

(56) References Cited

U.S. PATENT DOCUMENTS

| | | | | |
|---|---|---|---|---|
| 3,748,644 | A | * | 7/1973 | Tisdale .......................... 382/201 |
| 2005/0036044 | A1 | * | 2/2005 | Funakura ...................... 348/239 |

(Continued)

FOREIGN PATENT DOCUMENTS

| | | |
|---|---|---|
| EP | 1507386 A1 | 2/2005 |
| JP | 2003-274263 A | 9/2003 |

(Continued)

OTHER PUBLICATIONS

Japanese Office Action dated Oct. 15, 2012 (and English translation thereof) in counterpart Japanese Application No. 2010-255460.
Chinese Office Action dated Jul. 30, 2014 issued in counterpart Chinese Application No. 201110358267.4.

*Primary Examiner* — Amy Hsu
(74) *Attorney, Agent, or Firm* — Holtz, Holtz, Goodman & Chick PC

(57) ABSTRACT

An object of the exemplary embodiment is to make it possible to easily take a group photo of a plurality of persons including a photographer.
In a digital camera 1, an image a of other photographed persons is taken by a photographer immediately after an instruction of a composite shooting mode is given. Next, the digital camera 1 is handed over to one of the other photographed persons, by whom an image b of the photographer is taken. When predetermined synthesizing conditions are satisfied, a facial image contained in one of the two taken images a and b shot in series is synthesized with the other taken image so that a new composite image c is created. Thus, a group photo in which all the persons have been photographed can be synthesized easily.

6 Claims, 12 Drawing Sheets

(56) References Cited

U.S. PATENT DOCUMENTS

| | | | |
|---|---|---|---|
| 2006/0078224 A1* | 4/2006 | Hirosawa | 382/284 |
| 2007/0286589 A1* | 12/2007 | Ishiwata et al. | 396/125 |
| 2008/0232712 A1* | 9/2008 | Matsui et al. | 382/277 |
| 2008/0239092 A1 | 10/2008 | Sugino et al. | |
| 2008/0285817 A1* | 11/2008 | Imamura | 382/118 |
| 2010/0026830 A1* | 2/2010 | Kim | 348/222.1 |
| 2010/0111408 A1* | 5/2010 | Matsuhira et al. | 382/164 |
| 2010/0118161 A1* | 5/2010 | Tsurumi | 348/231.3 |
| 2010/0124941 A1* | 5/2010 | Cho | 455/556.1 |
| 2010/0173678 A1* | 7/2010 | Kim et al. | 455/566 |
| 2010/0225773 A1* | 9/2010 | Lee | 348/222.1 |
| 2010/0271507 A1* | 10/2010 | Hung et al. | 348/231.99 |

FOREIGN PATENT DOCUMENTS

| | | |
|---|---|---|
| JP | 2005-94741 A | 4/2005 |
| JP | 2006-203600 A | 8/2006 |
| JP | 2007-166383 A | 6/2007 |
| JP | 2008-234518 A | 10/2008 |
| JP | 2008-242636 A | 10/2008 |
| JP | 4396720 B2 | 10/2009 |
| JP | 4396720 B2 | 1/2010 |
| JP | 2010-034837 A | 2/2010 |
| JP | 2010-034838 A | 2/2010 |
| JP | 2010-193307 A | 9/2010 |

\* cited by examiner

PHOTOGRAPHER SIDE    PHOTOGRAPHED PERSONS SIDE

TAKEN IMAGE a

PHOTOGRAPHER SIDE    PHOTOGRAPHED PERSONS SIDE

TAKEN IMAGE b a

+ b c

IMAGING APPARATUS AND IMAGE SYNTHESIZING METHOD

CROSS REFERENCE TO RELATED APPLICATION(S)

The present disclosure relates to the subject matters contained in Japanese Patent Application No. 2010-255460 filed on Nov. 16, 2010, which are incorporated herein by reference in its entirety.

FIELD

Exemplary embodiments of the present invention relate to an imaging apparatus and an image synthesizing method suitable for taking a group photo.

BACKGROUND

When one of a plurality of persons serves as a photographer to take a group photo of the persons, the photographer cannot be in the group photo. Therefore, it has been necessary to ask a third person to take a photo or to fix a camera to a tripod in order to take a photo with a self-timer.

However, when there is no third person or when there is no tripod, the camera has to be placed on top of something to take a photo with the self-timer. Due to some location where the camera is placed, it may be difficult to set an angle of view. Further, to perform shooting with the self-timer, a photographer sets an angle of view to have all the persons except the photographer come within a visual field of the camera, pushes a shutter button and then goes into the visual field as a photographed person quickly. On this occasion, due to some position the photographer enters, the photographer may be out of the set angle of view or the positions of the photographed persons as a whole may change so that the photographed persons cannot come within the set angle of view.

Therefore, there has been proposed a technique in which an image of photographed persons except a photographer is first taken, an image of the photographer is next taken, and the two taken images are suitably synthesized to create a group photo having all the persons photographed (see JP-A-2005-94741, for instance).

The related-art technique has been described on the assumption that a cellular phone which has imaging portions in a front surface and a back surface of its body is used. A facial region of the photographer is detected from data of a photographer-side image taken by a first camera portion. Based on data of a photographed persons-side image taken by a second camera portion, a region which does not include any photographed persons is discriminated from regions of the photographed persons. Based on a result of the discrimination, the detected facial region of the photographer is synthesized in the region which does not include any photographed persons.

SUMMARY

In the aforementioned related-art technique, the photographer and the photographed persons are shot concurrently by the first camera portion and the second camera portion so that labor for photographing can be saved. On the assumption that a typical digital camera etc. is used, however, there may a problem that provision of two imaging portions, particularly provision of two imaging portions only for taking a group photo leads to inefficiency as well as increase in cost.

It is therefore an object of exemplary embodiments of the invention to provide an imaging apparatus and an image synthesizing method in which a group photo of a plurality of persons including a photographer can be taken easily.

According to a first aspect of the invention, there is provided an imaging apparatus including: an imaging portion which takes images of subjects; an instruction portion which gives an instruction to synthesize two taken images; a first specification portion which specifies, as a first taken image, a taken image first shot by the imaging portion after the instruction given by the instruction portion or a taken image last shot by the imaging portion before the instruction given by the instruction portion; a second specification portion which specifies a second taken image having a predetermined relation to the first taken image; a facial image extraction portion which extracts a facial image from one taken image of the two taken images including the first taken image and the second taken image; and a synthesizing portion which synthesizes the facial image extracted by the facial image extraction portion with a region of the other taken image of the two taken images where there is no facial image.

According to a second aspect of the invention, there is provided an image synthesizing method in an imaging apparatus comprising an imaging portion for taking images of subjects, the method including: giving an instruction to synthesize two taken images; specifying, as a first taken image, a taken image first shot by the imaging portion after the instruction is given, or a taken image last shot by the imaging portion before the instruction is given; specifying a second taken image having a predetermined relation to the first taken image; extracting a facial image from one taken image of the two taken images including the first taken image and the second taken image; and synthesizing the extracted facial image with a region of the other taken image of the two taken images where there is no facial image.

According to the embodiments, it is possible to gain an advantage that a group photo of a plurality of persons including a photographer can be taken easily.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

DETAILED DESCRIPTION OF THE EMBODIMENTS

Embodiments of the invention will be described below with reference to the drawings.

A. First Embodiment

Figure 1:
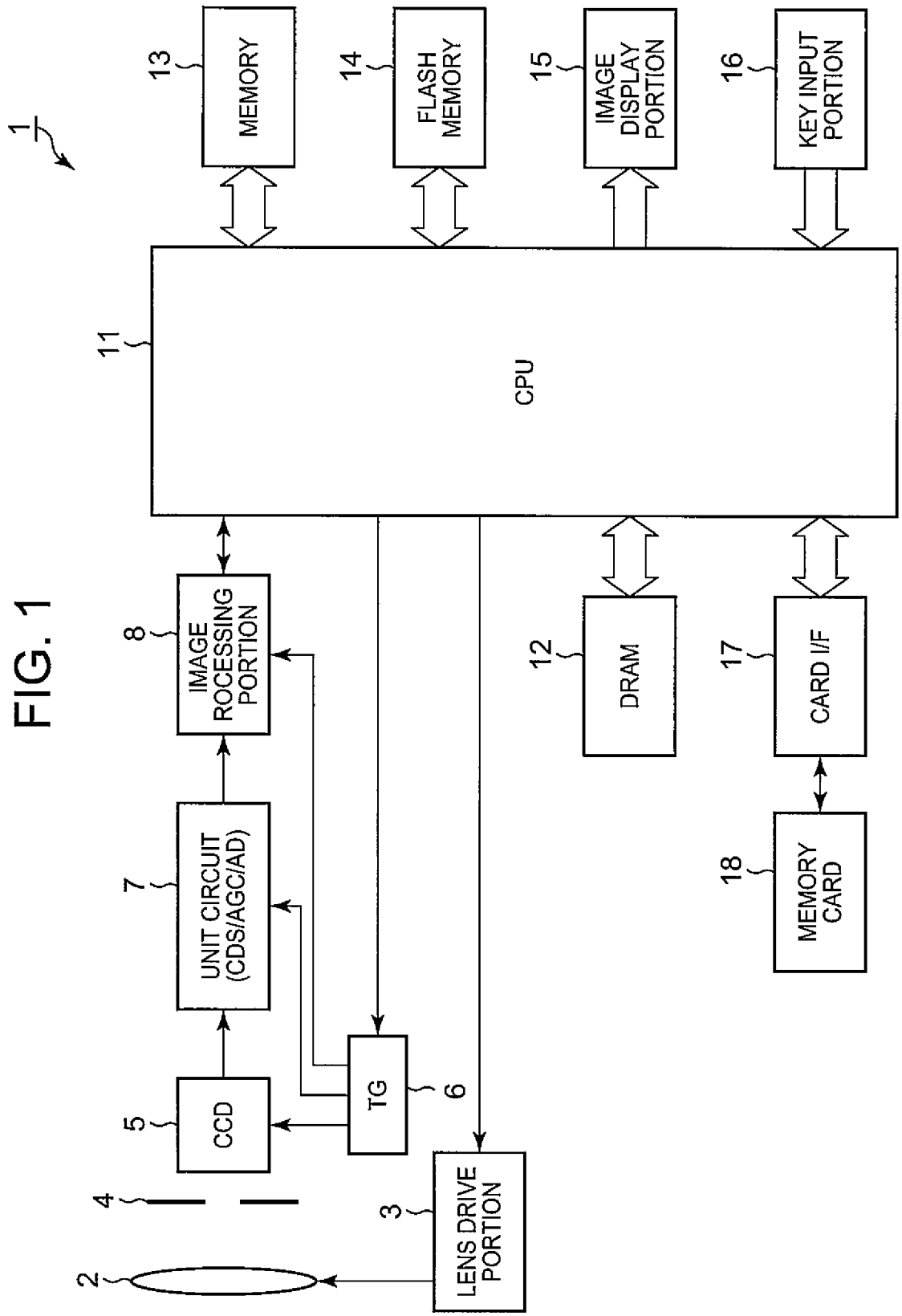
FIG. 1 is a block diagram showing configuration of a digital camera according to a first embodiment of the invention.

FIG. 1 is a block diagram showing configuration of a digital camera according to a first embodiment of the invention. In FIG. 1, a digital camera 1 has an imaging lens 2, a lens drive portion 3, a shutter 4 which also serves as an aperture, a CCD 5, a Timing Generator (TG) 6, a unit circuit 7, an image processing portion 8, a CPU 11, a DRAM 12, a memory 13, a flash memory 14, an image display portion 15, a key input portion 16, a card I/F 17, and a memory card 18.

The imaging lens 2 includes a focus lens, a zoom lens, etc. The lens drive portion 3 is connected to the imaging lens 2. The lens drive portion 3 is configured by motors, a focus motor driver and a zoom motor driver. The motors drive the focus lens and the zoom lens forming the imaging lens 2, in the directions of their optical axes respectively. The focus motor driver and the zoom motor driver drive the focus motor and the zoom motor in accordance with control signals from the CPU 11, respectively.

The aperture 4 includes a not-shown drive circuit, which operates the aperture 4 in accordance with a control signal sent from the CPU 11. The aperture 4 controls the quantity of light entering through the imaging lens 2. By the CCD (imaging device) 5, light of a subject projected through the imaging lens 2 and the aperture 4 is converted into an electric signal which is outputted as an imaging signal to the unit circuit 7. In addition, the CCD 5 is driven in accordance with a timing signal of a predetermined frequency generated by the TG 6.

The unit circuit (CDS/AGC/AD) 7 is configured by a Correlated Double Sampling (CDS) circuit, an Automatic Gain Control (AGC) circuit and an A/D converter. The CDS circuit performs correlated double sampling on the imaging signal outputted from the CCD 5, and holds the sampled imaging signal. The AGC circuit performs automatic gain control on the sampled imaging signal. The A/D converter converts an analog imaging signal subjected to the automatic gain control into a digital signal. The imaging signal of the CCD 5 is sent as the digital signal to the image processing portion 8 through the unit circuit 7. The unit circuit 7 is driven in accordance with a timing signal of a predetermined frequency generated by the TG 6.

The image processing portion 8 performs image processing (pixel interpolation processing, γ-correction, generation of luminance and color-difference signals, white balance processing, exposure compensation processing, etc.) on image data sent from the unit circuit 7, processing for compressing/expanding (for example, compressing/expanding in a JPEG format, an M-JPEG format or an MPEG format) the image data, processing for synthesizing taken images, etc. The image processing portion 8 is driven in accordance with a timing signal of a predetermined frequency generated by the TG 6.

The CPU 11 is a one-chip microcomputer for controlling the respective portions of the digital camera 1. Particularly in the first embodiment, the CPU 11 recognizes faces of subjects in two taken images shot within a predetermined time, estimates positions of the faces, and synthesizes a facial part (or the whole body of a subject) of one of the taken images with the other taken image.

The DRAM 12 is used as a buffer memory for temporarily storing the image data taken by the CCD 5 and then sent to the CPU 11. The DRAM 12 is also used as a working memory for the CPU 11. In the memory 13, programs required for control of the respective portions of the digital camera 1 by the CPU 11 and data required for the control of the respective portions are recorded. The CPU 11 performs processing along the programs. The flash memory 14 or the memory card 18 serves as a recording medium for storing image data taken by the CCD 5, synthesized image data, etc.

The image display portion 15 includes a color LCD and a drive circuit thereof. When the digital camera 1 stands by for shooting, an image of a subject taken by the CCD 5 is displayed as a live view image on the image display portion 15. For reproducing a recorded image, the recorded image read from the flash memory 14 or the memory card 18 and expanded is displayed on the image display portion 15. The key input portion 16 includes a plurality of operation keys such as a shutter SW, a zoom SW, a mode key, a SET key, cross keys, etc. The key input portion 16 outputs an operation signal to the CPU 11 in accordance with a user's key operation. The memory card 18 is removably attached to the card I/F 17 through a not-shown card slot in a body of the digital camera 1.

The CPU 11 executes various processings in accordance with the programs stored in the memory 13.

Those processings may be achieved by the CPU 11 executing the programs stored in the memory 13. Alternatively, a dedicated processing circuit (processing portion) may be provided for performing the processings.

That is, the digital camera 1 includes:

an imaging portion which takes images of subjects;

an instruction portion which gives an instruction to synthesize two taken images;

a first specification portion which specifies, as a first taken image, a taken image first shot by the imaging portion after the instruction given by the instruction portion or a taken image last shot by the imaging portion before the instruction given by the instruction portion;

a second specification portion which specifies a second taken image having a predetermined relation to the first taken image; a facial image extraction portion which extracts a facial image from one taken image of the two taken images including the first taken image and the second taken image; and a synthesizing portion which synthesizes the facial image extracted by the facial image extraction portion with a region of the other taken image of the two taken images where there is no facial image.

Further, the second specification portion may specify, as the second taken image, a taken image shot in series by the own digital camera 1 before or after the first taken image is taken.

Further, the second specification portion may specify, as the second taken image, a taken image shot by other digital camera before or after the first taken image is taken;

the digital camera 1 may further include a transmission portion which transmits the first taken image shot by the own digital camera 1, to the other digital camera; and the two taken images including the first taken image and the second taken image may be synthesized on the other digital camera to which the first taken image is transmitted.

Further, the other digital camera may be located around the digital camera 1, the digital camera 1 may further include a cooperative shooting requesting portion which requests the other digital camera to perform cooperative shooting, and the second specification portion may specify, as the second taken image, a taken image shot by the other digital camera in response to the request for the cooperative shooting made by the cooperative shooting requesting portion.

Further, the facial image extraction portion may extract a facial image from the first taken image taken by the imaging portion; and the transmission portion may transmit the facial image extracted by the facial image extraction portion to the other digital camera.

Further, the facial image extraction portion may extract a facial image from the first taken image taken by the imaging portion; and the transmission portion may transmit the facial image extracted by the facial image extraction portion to the other digital camera.

Further, the instruction portion may give an instruction to synthesize the two taken images, in response to the request for the cooperative shooting received from the other digital camera which is located around the digital camera 1; and the first specification portion which has received the request for the cooperative shooting from the other digital camera which is located around the digital camera 1 may specify the taken image shot by the digital camera 1 as the first taken image and specify the taken image shot by the other digital camera, which has requested the cooperative shooting, as the second taken image.

Further, the facial image extraction portion may determine that an instruction operation has been performed to give an instruction to synthesize the two taken images, and extract a facial image from one taken image of the two taken images including the first taken image shot by the digital camera 1 and the second taken image shot by the other digital camera which is located around the digital camera 1 when the request for the cooperative shooting is received from the other digital camera; and the synthesizing portion may synthesize the facial image extracted by the facial image extraction portion with the region of the other taken image of the two taken images where there is no facial image.

Further, the digital camera 1 may further include a determination portion which determines whether predetermined synthesizing condition is satisfied or not before the synthesizing portion synthesizes images, and the synthesizing portion may synthesize the facial image extracted by the facial image extraction portion with the region of the other taken image of the two taken images where there is no facial image when the determination portion determines that the predetermined synthesizing condition is satisfied.

Further, the predetermined synthesizing condition may include that there is one face which is not smaller than a predetermined size within the one taken image and there are a plurality of faces each of which is not smaller than a predetermined size within the other taken image.

Further, the predetermined synthesizing conditions may include that members whose faces are detected from one of the two taken images are different from members whose faces are detected from the other taken image.

Further, when the two taken images have a common background, the synthesizing portion may synthesize the facial image of the one taken image with the region of the other taken image where there is no facial image so that a positional relation between the background and persons in each of the taken images can be kept.

Further, the digital camera 1 may further include a comparison portion which compares numbers of facial images contained in the two taken images with each other, the facial image extraction portion may extract facial images from the taken image having a smaller number of faces based on a result of comparison in the comparison portion; and the synthesizing portion may synthesize the facial images extracted by the facial image extraction portions with a region of the taken image having a larger number of faces, in which region there is no facial image.

Further, the digital camera 1 may further include a storage portion which stores the two taken images specified by the specification portion so that the taken images are associated with each other.

Figure 2A:
FIGS. 2A to 2C are conceptual views showing a fundamental flow to take a group photo with the digital camera according to the first embodiment.
Figure 2A:
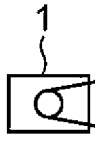
Figure 2A:
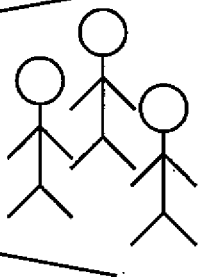
Figure 2B:
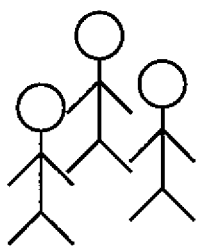
Figure 2B:
Figure 2B:
Figure 2C:
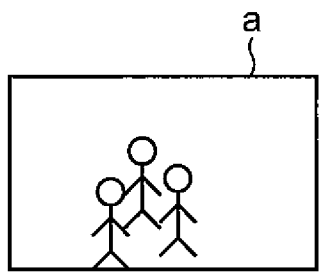
Figure 2C:
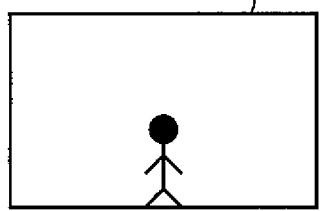
Figure 2C:
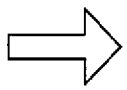
Figure 2C:
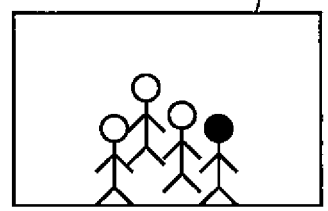

FIGS. 2A to 2C are conceptual views showing a fundamental flow to take a group photo with the digital camera according to the first embodiment. First, as shown in FIG. 2A, just after an instruction of a composite shooting mode is given, an image a of other photographed persons is taken in accordance with a user operation (pushing down a shutter button) of a photographer. Next, as shown in FIG. 2B, the digital camera 1 is handed to one of the other photographed persons, who performs a user operation to take an image b of the aforementioned photographer. When predetermined synthesizing conditions (which will be described later) are satisfied, a facial image included in one of the two taken images a and b shot in series in accordance with the user operations performed in series within a predetermined period of time required for handing over the camera is synthesized with the other taken image so that a new composite image c is created, as shown in FIG. 2C. Thus, a group photo in which all the persons have been photographed can be synthesized easily.

The aforementioned predetermined period of time is a period until the image b is taken by one of the photographed persons with the digital camera 1 handed to the photographed person after the image a is taken. For example, the predetermined period of time may be assumed to be in a range of from about 3 seconds to about 30 seconds. Although two taken images shot in series may be set as targets of synthesizing processing simply, an upper limit or a lower limit of a shooting interval may be set as the aforementioned predetermined period of time in advance. On this occasion, when the shooting interval is shorter than the lower limit of the predetermined period of time or when the next image is not taken within (the upper limit of) the predetermined period of time, the first image a is regarded as being taken normally, and the synthesizing processing is prevented from being performed.

In other words, two taken images shot in series within the predetermined period of time are specified as two taken images which should be synthesized.

In addition, in the case where the synthesizing conditions are satisfied to perform the synthesizing processing or the case where the synthesizing processing is not performed, the taken image a and the taken image b shot in series in accordance with the user operations performed in series within the predetermined period of time immediately after the instruction of the aforementioned composite shooting mode is given are regarded as relevant to each other. Thus, the taken image a and the taken image b are associated with each other. Here, a method such as addition of a tag to data may be used as the method for associating the taken images. For example, when a photographer takes a photographer's own image after taking a group photo, those two taken images are associated with each other. Thus, the photographer can confirm easily later that the photographer was there at that time.

Figure 3:
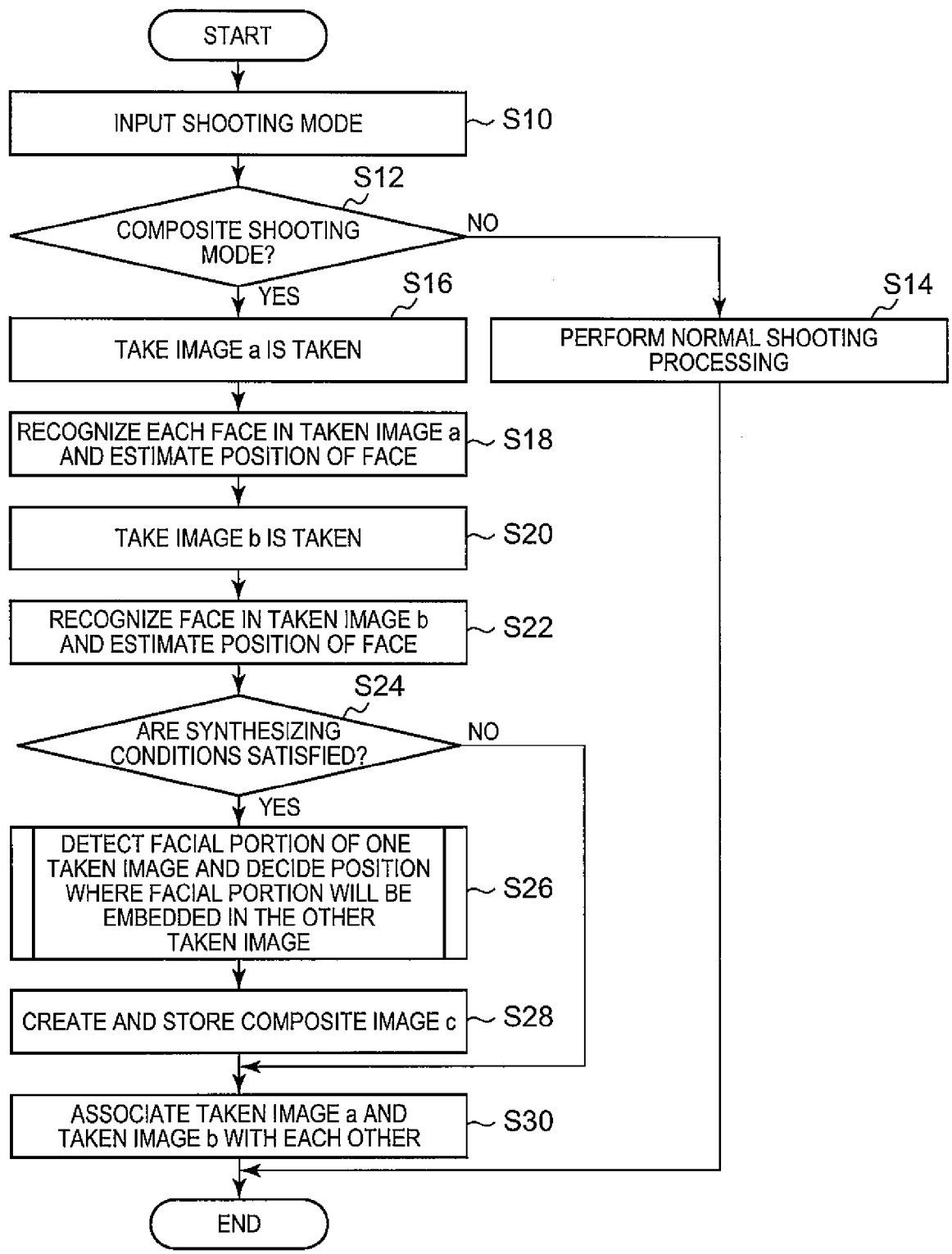
FIG. 3 is a flow chart for explaining operation of the digital camera according to the first embodiment.

FIG. 3 is a flow chart for explaining operation of the digital camera according to the first embodiment. First, a shooting mode is inputted by a user operation (Step S10). Next, determination is made as to whether the inputted shooting mode is a composite shooting mode or not (Step S12). When the shooting mode is not a composite shooting mode, determination is made that the shooting mode is another shooting mode, e.g. a normal shooting mode, and normal shooting processing is executed (Step S14). After that, the processing is terminated (or returns to Step S10).

On the other hand, when the inputted shooting mode is a composite shooting mode, an image a is taken with the digital camera 1 in accordance with a user operation of a photographer (Step S16). Next, face recognition is performed on the taken image a, and positions of faces are estimated in the taken image a based on the result of the face recognition (Step S18). Next, an image b is taken in accordance with a user operation of a photographer (Step S20). Face recognition is performed on the taken image b, and a position of a face is estimated in the taken image b based on the result of the face recognition (Step S22). That is, the taken images a and b are specified as two taken images which were taken in series and which should be synthesized.

Figure 4:
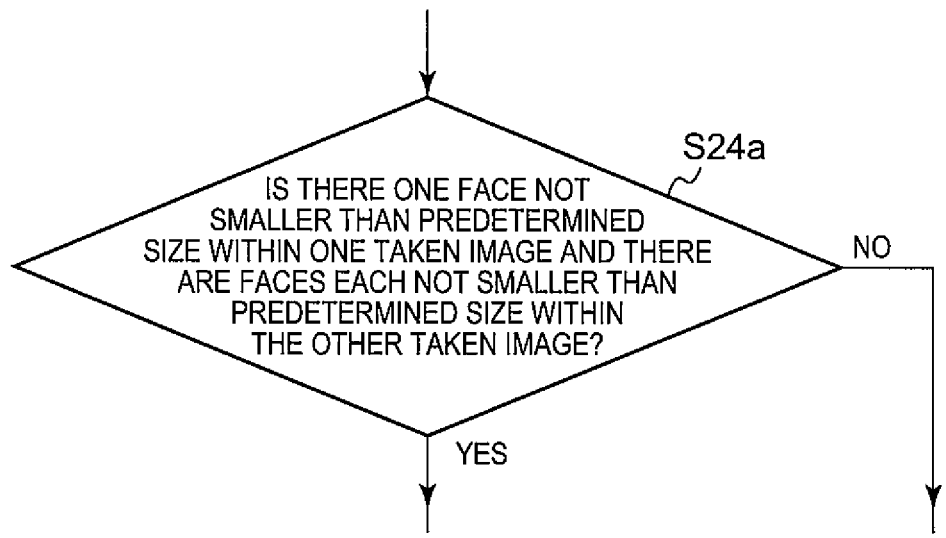
FIG. 4 is a flow chart showing exemplary synthesizing conditions in the operation of the digital camera according to the first embodiment.
Figure 5:
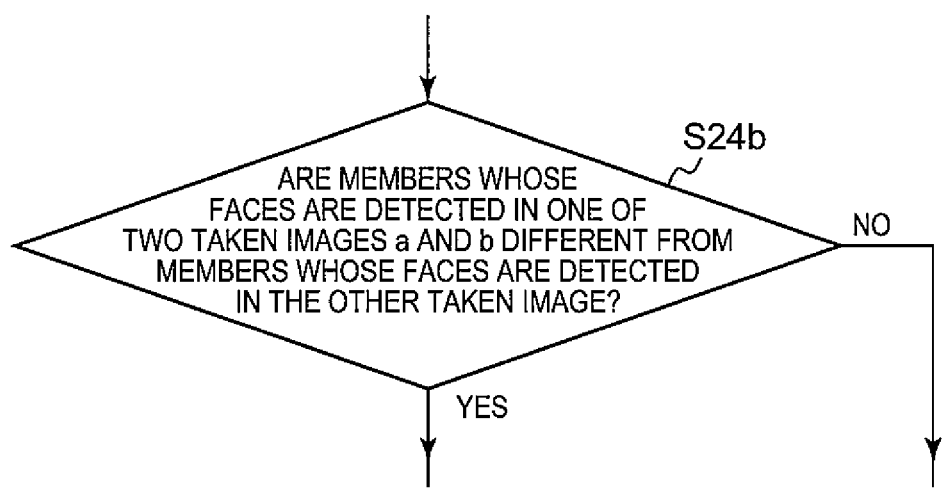
FIG. 5 is a flow chart showing exemplary synthesizing conditions in the operation of the digital camera according to the first embodiment.

Next, determination is made as to whether synthesizing conditions are satisfied or not (Step S24). The synthesizing conditions include whether or not one face not smaller than a predetermined size is present in one of the taken images (for example, the taken image b) and a plurality of faces each not smaller than a predetermined size are present in the other taken image (for example, the taken image a) as shown in FIG. 4 (Step S24a), or whether members whose faces are detected in the two taken images a and b respectively are different or not as shown in FIG. 5 (Step S24b). When the synthesizing conditions are set thus, unnecessary synthesizing processing such as synthesizing taken images with no face image or synthesizing taken images with the same members can be prevented from being carried out.

When the synthesizing conditions are satisfied, a facial portion in one taken image (for example, the taken image b) is detected while a position where the facial portion will be embedded in the other taken image (for example, the taken image a) is determined in order to synthesize the facial portion (Step S26). Details of the processing in Step S26 in which a facial portion is detected in one taken image and a position where the facial portion will be embedded in the other taken image will be described later.

Next, the facial portion of the one taken image (for example, the taken image b) is synthesized in the position where the facial portion will be embedded in the other taken image (for example, the taken image a) so that a composite image c is created and stored (Step S28). Next, the taken image a and the taken image b are associated with each other (Step S30). After that, the processing is terminated (or returns to Step S10).

On the other hand, when the synthesizing conditions are not satisfied in Step S24, the taken image a and the taken image b are not subjected to synthesizing processing but associated with each other in Step S30. After that, the processing is terminated (or returns to Step S10).

Figure 6:
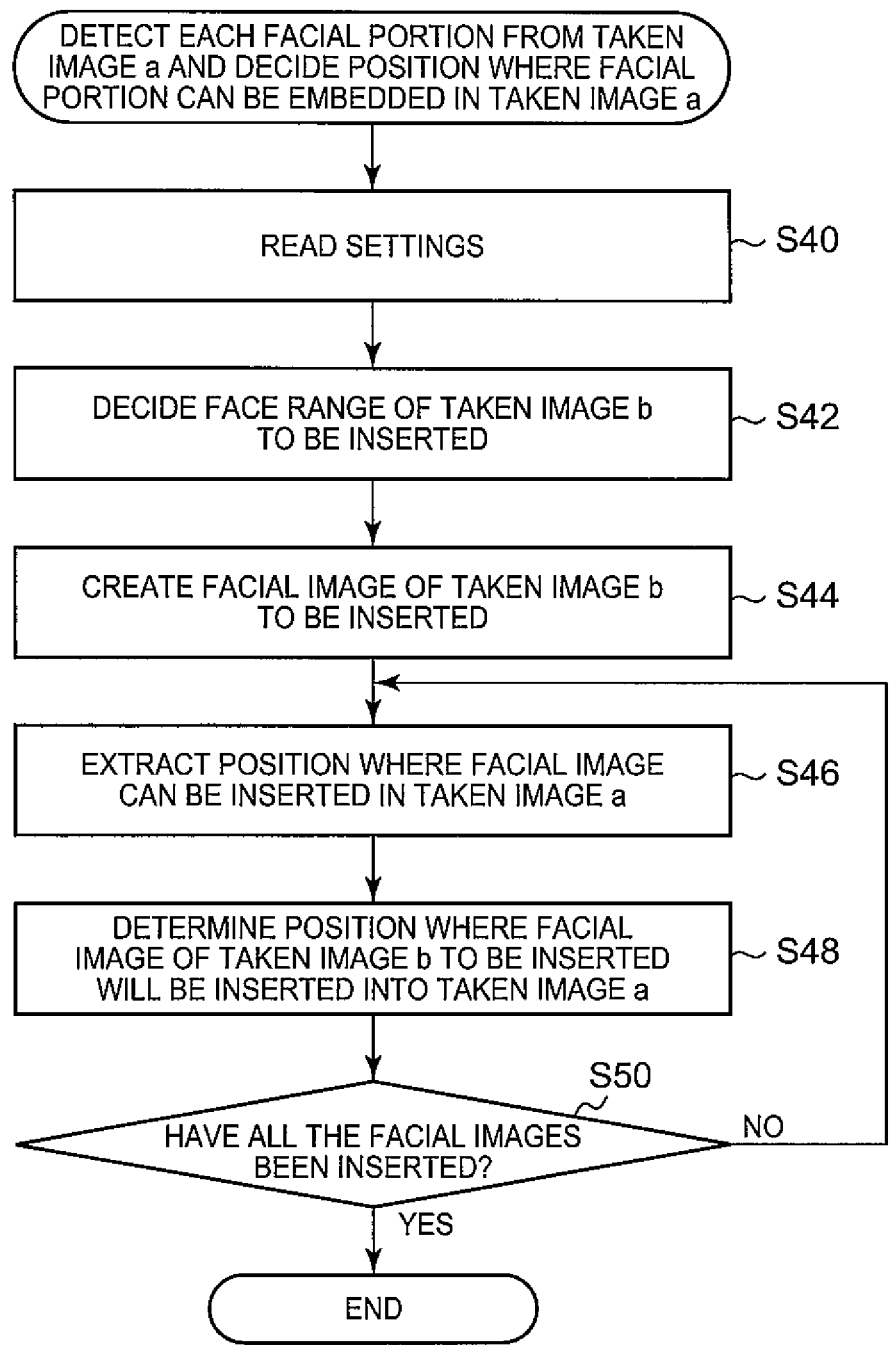
FIG. 6 is a flow chart for explaining the processing of Step S26 according to the first embodiment, in which each facial portion is detected in one taken image and a position where the facial portion will be embedded in the other taken image is determined.
Figure 7:
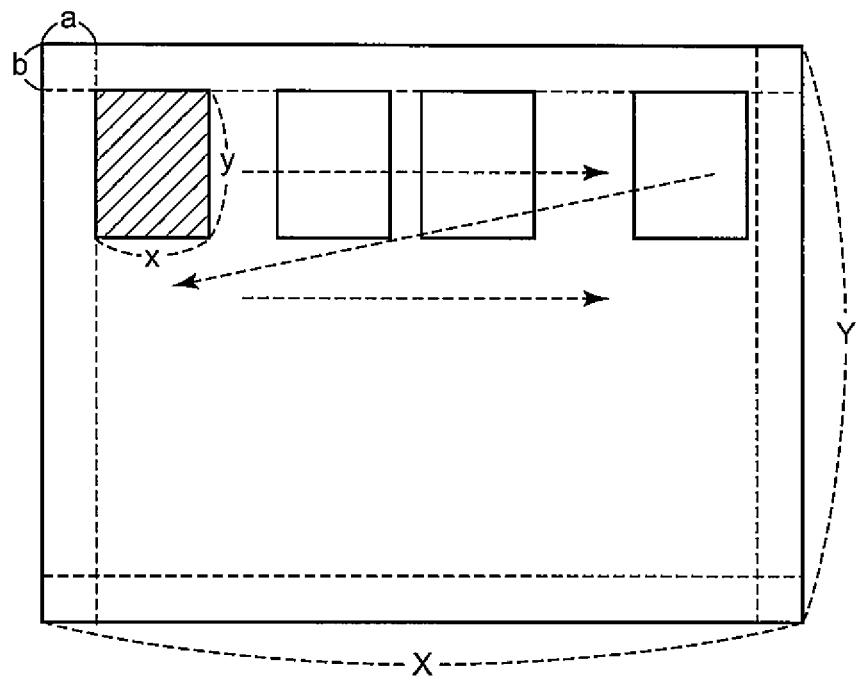
FIG. 7 is a conceptual view showing an example of operation for deciding an insertion position in a taken image a in the first embodiment.
Figure 8:
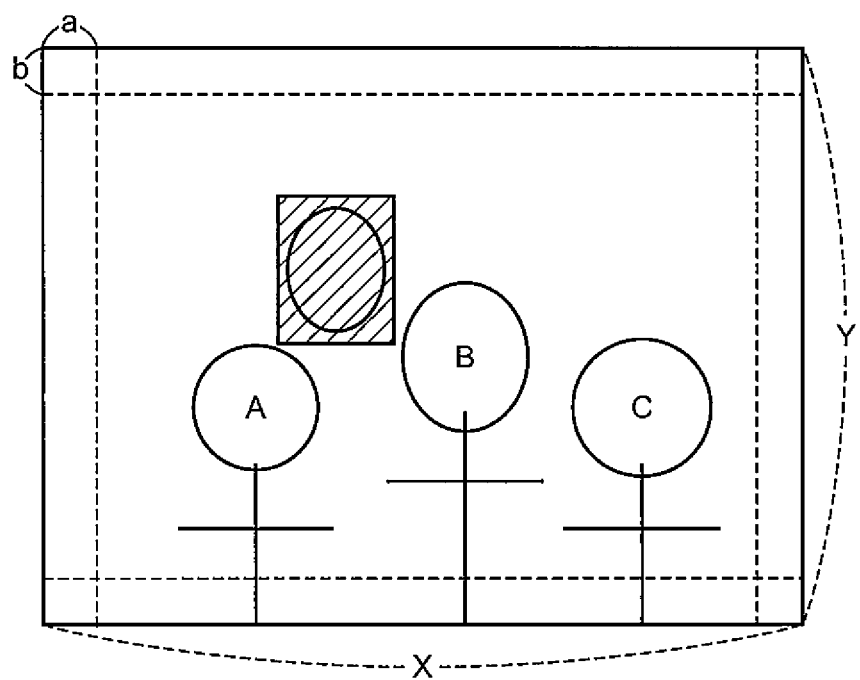
FIG. 8 is a conceptual view showing the example of operation for deciding the insertion position in the taken image a in the first embodiment.

FIG. 6 is a flow chart for explaining the processing of Step S26 according to the first embodiment, in which each facial portion is detected in one taken image and a position where the facial portion will be embedded in the other taken image is determined. FIGS. 7 and 8 are conceptual views showing an example of operation for deciding an insertion position in a taken image a. The following description will be made on the assumption that the one taken image is a taken image b and the other taken image is a taken image a.

First, contents of predetermined settings are read (Step S40). The contents of the settings include designation of a range where the image of the facial portion of the taken image b is not allowed to be embedded in left, right, upper and lower edges of the taken image a (corresponding to values a and b shown in FIG. 7, for instance) because it looks poorly if the image of the facial portion of the taken image b is embedded exactly in an edge of the taken image a, setting of maximum numbers of vertical and horizontal dots of the image to be embedded and the maximum ratio of the image to be embedded to the taken image a, etc.

Next, a facial range to be inserted is determined based on the facial portion recognized in the taken image b (Step S42). The shaded portion shown in FIG. 7 corresponds to the facial range to be inserted. Next, the portion is expanded or reduced to an appropriate size (x, y) correspondingly to the size of each face in the taken image a based on the contents of the settings, so as to be created as a to-be-inserted facial image of the taken image b (Step S44). Next, the to-be-inserted facial image of the taken image b is superimposed on the taken image a, and an insertion possible position for adding the to-be-inserted facial image (of the photographer) obtained from the taken image b is extracted from the taken image a (Step S46).

Next, as shown in FIG. 7, first, the to-be-inserted facial image is put on the upper left of the taken image a. When there is no facial image of the taken image a (or no to-be-inserted facial image which has been already superposed) in the range where the to-be-inserted facial image has been put, the to-be-inserted facial image is displaced downward and moved from right to left. Thus, a position just before a position where a facial image of the taken image a (or a to-be-inserted facial image which has been already superposed) is present at the beginning is determined as a position where the to-be-inserted facial image of the taken image b will be inserted in the taken image a (Step S48).

For example, as shown in FIG. 8, assume that there are persons A, B and C in the taken image a. In this case, a position where the to-be-inserted facial image of the taken image b is not superposed on any person A, B or C of the taken image a is determined as the insertion position. At this time, the position where the to-be-inserted facial image of the taken image b will be inserted on the taken image a is determined, so that the remaining insertion possible positions in the taken image a do not include the determined insertion position.

Next, determination is made as to whether all the facial images of the taken image b have been inserted or not (Step S50). When there is a facial image which has not yet been inserted, the processing returns to Step S46, in which the aforementioned processing is repeated so that a position where the to-be-inserted facial image of the taken image b will be inserted is determined as one of the remaining insertion possible positions in the taken image a. It is a matter of course that the position where each to-be-inserted facial image will be inserted is determined so that the to-be-inserted facial image can be prevented from being put on any facial image of the taken image a or any other to-be-inserted facial image.

According to the aforementioned first embodiment, when there is carried out an instruction operation for giving an instruction to synthesize two taken images, two taken images shot in series in accordance with user operations (pushing the shutter button) performed in series with one digital camera at different timings, i.e. within a predetermined period of time, are specified and the specified two taken images are synthesized. In this manner, a group photo of a plurality of persons including a photographer can be taken easily.

In addition, when a plurality of faces each not smaller than a predetermined size are detected in one taken image and one face not smaller than a predetermined size is detected in the other taken image, two taken images shot in accordance with user operations (pushing the shutter button) performed in series with one digital camera at different timings, i.e. within a predetermined period of time are specified, and the specified two taken images are synthesized so that a group photo of a plurality of persons including a photographer can be taken more surely and easily.

In addition, when members whose faces are detected in two taken images are different, two taken images shot in accordance with user operations (pushing the shutter button) performed in series with one digital camera at different timings, i.e. within a predetermined period of time, are specified and the specified two taken images are synthesized so that a group photo of a plurality of persons including a photographer can be taken efficiently and easily because two taken images with the same members are not synthesized with each other.

B. Second Embodiment

Next, a second embodiment of the invention will be described.

The second embodiment will be described on the assumption that a group photo is intended to be taken with the same scenery (such as a mountain, an ocean or a building) as the background in a journey etc. Therefore, the second embodiment has the following characteristic. That is, when taken images a and b shot in accordance with user operations carried out in series within a predetermined period of time have a common background, a position where a to-be-inserted facial image of one taken image will be inserted in the other taken image is determined to keep the positional relation between the background and each person in each taken image a, b. When the taken images a and b do not have a common background, a position where a to-be-inserted facial image of one taken image will be inserted in the other taken image is determined to prevent faces from being superposed on each other, in the same manner as in the aforementioned first embodiment. Since the configuration of the digital camera 1 is similar to that in FIG. 1, description thereof will be omitted.

Figure 9:
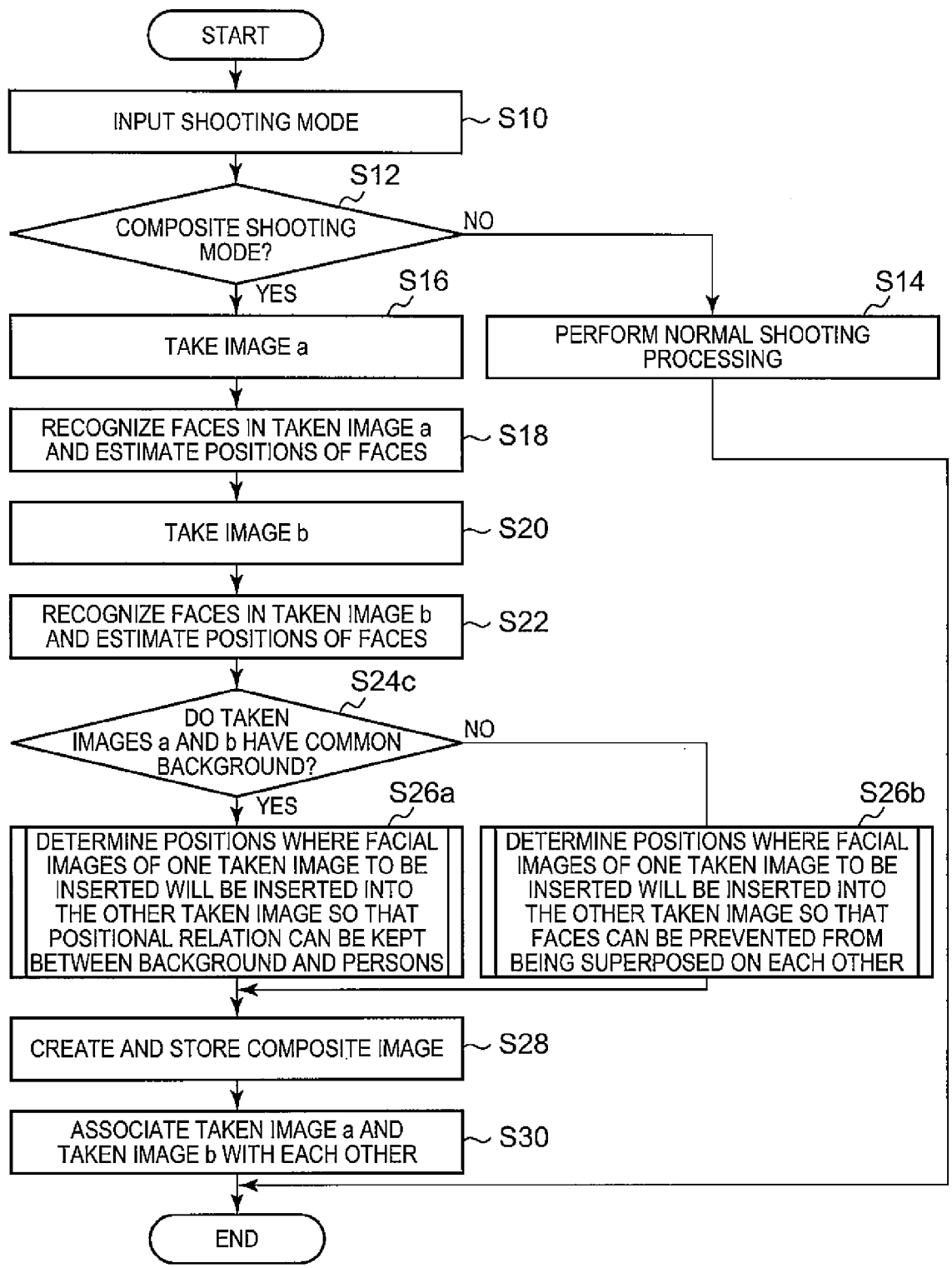
FIG. 9 is a flow chart for explaining operation of a digital camera according to a second embodiment of the invention.

FIG. 9 is a flow chart for explaining operation of the digital camera according to the second embodiment. Steps similar to those in FIG. 3 are referred to by the same numerals respectively. FIG. 9 is the same as FIG. 3 except Step S24c and Steps S26a and 26b.

In the same manner as in the aforementioned first embodiment, faces in taken images a and b shot in accordance with user operations carried out in series within a predetermined period of time are recognized and positions of the faces are estimated in Steps S10 to S22 immediately after a composite shooting mode is inputted as a shooting mode. After that, determination is made as to whether the taken images a and b have a common background or not (Step S24c). That is, the taken images a and b are specified as two taken images shot in series. When the taken images a and b have a common background, the position where a to-be-inserted facial image of one taken image will be inserted in the other taken image is determined to keep the positional relation between the background and each person in each taken image a, b (Step S26a).

On the contrary, when the taken images a and b do not have a common background, a position where a to-be-inserted facial image of one taken image will be inserted in the other taken image is determined to prevent faces from being superposed on each other, in the same manner as in the aforementioned first embodiment (Step S26b).

After that, in the same manner as in the aforementioned first embodiment, the facial portion of one of the taken images (for example, the taken image b) is synthesized with the other taken image (for example, the taken image a) in the position where the facial portion will be embedded therein, so that a composite image c is created and stored. The taken images a and b are associated with each other in Step S30, and the processing is terminated (or returns to Step S10).

Although Step S24c and Steps 26a and 26b shown in FIG. 9 have been explained briefly, the method for determining the insertion position may be fundamentally conform to the aforementioned flow chart shown in FIG. 6.

According to the aforementioned second embodiment, when two taken images shot in accordance with user operations performed in series at different timings, i.e. within a predetermined period of time, have a common background, the two taken images are synthesized while keeping the positional relation between the background and each person. Thus, a group photo of a plurality of persons including a photographer can be taken easily on the common background while keeping the positional relation between the background and each person.

C. Third Embodiment

Next, a third embodiment of the invention will be described.

The third embodiment has the following characteristic. That is, the number of faces contained in each taken image a, b is detected, and facial images are cut out from the taken image with a smaller number of faces and synthesized with the other taken image having a larger number of faces. Thus, processing for cutting out facial images and synthesizing the facial images can be reduced. Since the configuration of the digital camera 1 is similar to that in FIG. 1, description thereof will be omitted. In addition, since a main process is the same as that in the first embodiment (FIG. 3) or the second embodiment (FIG. 9), description thereof will be omitted.

Figure 10:
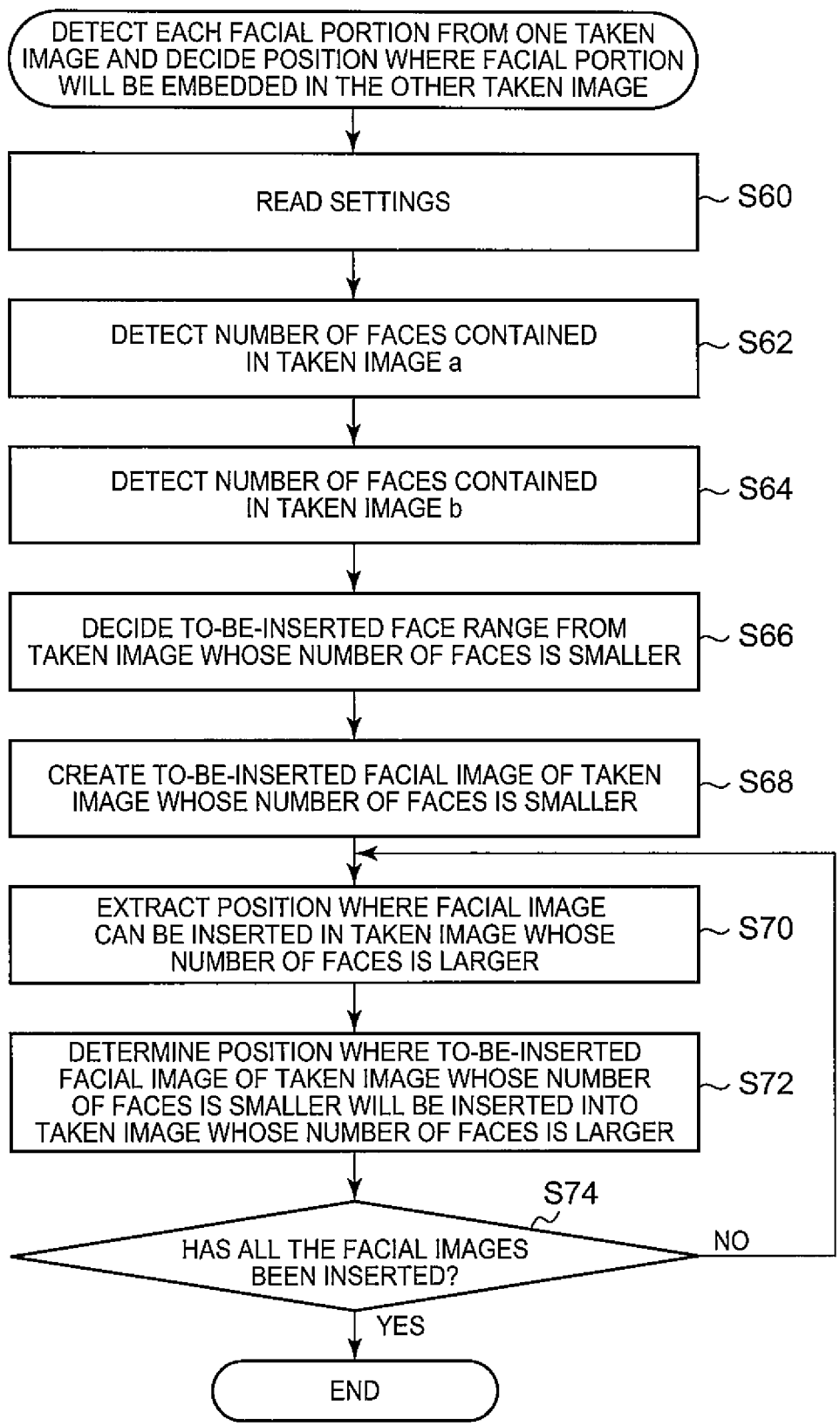
FIG. 10 is a flow chart for explaining processing according to a third embodiment of the invention, in which each facial portion is detected in one taken image and a position where the facial portion will be embedded in the other taken image is determined.

FIG. 10 is a flow chart for explaining processing according to the third embodiment, in which each facial portion is detected in one taken image and a position where the facial portion will be embedded in the other taken image is determined. First, contents of predetermined settings are read (Step S60). The contents of the settings include designation of a range where any image to be embedded is not allowed to be embedded in the left, right, upper and lower edges, setting of maximum numbers of vertical and horizontal dots of the image to be embedded or the maximum ratio of the image to be embedded to a taken image with which the image to be embedded will be synthesized, etc.

Next, the number of recognized faces contained in a taken image a is detected (Step S62), and the number of recognized faces contained in a taken image b is detected (Step S64). Next, a facial range to be inserted is determined from a taken image whose number of faces is smaller (Step S66), and a to-be-inserted facial image of the taken image whose number of faces is smaller is created (Step S68). On this occasion, the to-be-inserted facial image may be expanded or reduced to an appropriate size correspondingly to the size of each face in the other taken image, whose number of faces is larger, based on the contents of the settings. Next, the to-be-inserted facial image is superimposed on the taken image whose number of faces is larger, and a position where the to-be-inserted facial image can be inserted is extracted from the taken image whose number of faces is larger, in order to synthesize the to-be-inserted facial image (Step S70).

Next, the to-be-inserted facial image is put on the upper left of the taken image whose number of faces is larger. When there is no facial image of the taken image whose number of faces is larger (or no to-be-inserted facial image which has been already superposed) in the range where the to-be-inserted facial image has been put, the to-be-inserted facial image is displaced downward or moved from right to left. Thus, a position just before a position where a facial image of the taken image whose number of faces is larger (or a to-be-inserted facial image which has been already superposed) is present at the beginning (or a position where the to-be-inserted facial image is not superposed on any facial image) is determined as a position where the to-be-inserted facial image of the taken image whose number of faces is smaller will be inserted among the facial images of the taken image whose number of faces is larger (Step S72).

Next, determination is made as to whether the facial images of the taken image whose number of faces is smaller have been inserted or not (Step S74). When there is any facial image which has not yet been inserted, the flow of processing returns to Step S70, in which the aforementioned processing is repeated to determine an insertion possible position where the to-be-inserted facial image of the taken image whose number of faces is smaller will be inserted in the taken image whose number of faces is larger. It is a matter of course that the insertion positions are determined so that each to-be-inserted facial image can be prevented from being superposed on any facial image of the taken image a or any other to-be-inserted facial image which has been already inserted.

According to the aforementioned third embodiment, the number of faces contained in each of two taken images is detected, a facial portion is cut out from the taken image with a smaller number of faces and synthesized with the taken image with a larger number of faces. Accordingly, a group photo of persons including a photographer can be taken efficiently and easily.

According to the aforementioned first to third embodiments, a taken image a and a taken image b shot in series in accordance with user operations performed in series within a predetermined period of time immediately after a composite shooting mode is inputted as a shooting mode are specified as two taken images shot in series to be synthesized, and the specified two taken images a and b are synthesized. The invention is not limited thereto. Alternatively, taken images a and b may be specified as two taken images shot in series to be synthesized and the specified two taken images a and b may be synthesized when the composite shooting mode is inputted immediately after the taken image a and the taken image b are shot in series in accordance with user operations performed in series within a predetermined period of time. In this case, when the composite shooting mode is not inputted, the taken images a and b are recorded and stored as individual taken images without being synthesized, in the same manner as in normal shooting.

Shooting immediately after the composite shooting mode is inputted (or inputting the composite shooting mode immediately before shooting) means that shooting is carried out in accordance with user operations performed in series within a predetermined period of time before the digital camera is powered off or the operation mode is switched from the composite shooting mode to another operation mode after the composite shooting mode is inputted. On the other hand, inputting the composite shooting mode immediately after the taken image a and the taken image b are taken in series (or taking the taken image a and the taken image b immediately before the composite shooting mode is inputted) means that the composite shooting mode is inputted before another image is taken, the digital camera is powered off or the operation mode is switched from the composite shooting mode to another operation mode after the taken image a and the taken image b are taken in accordance with user operations carried out in series within a predetermined period of time, or the composite shooting mode is inputted before the elapse of a predetermined period time after the taken image a and the taken image b are taken in accordance with user operations carried out in series within a predetermined period of time.

D. Fourth Embodiment

Next, a fourth embodiment of the invention will be described.

Figure 11:
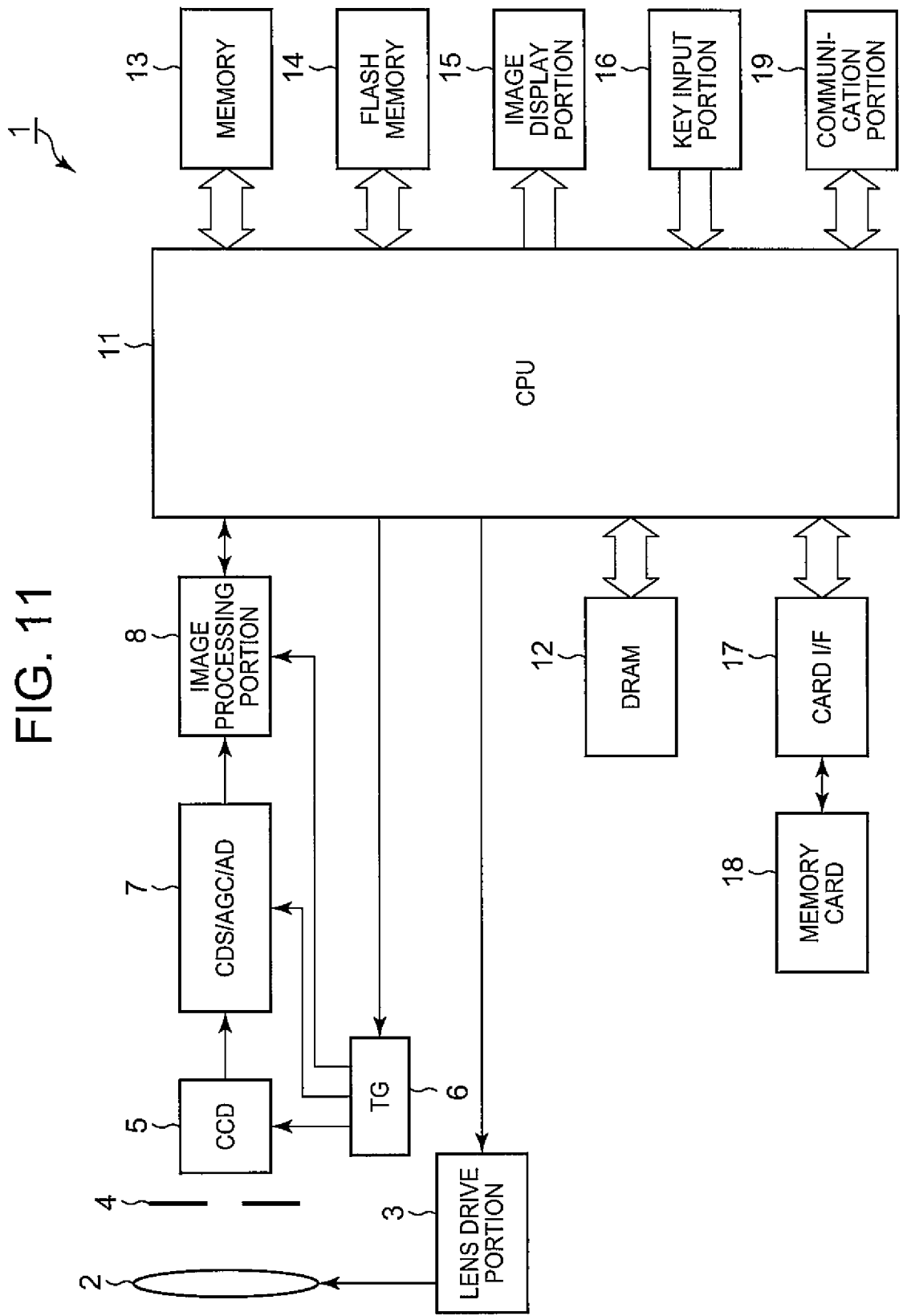
FIG. 11 is a block diagram showing configuration of a digital camera according to a fourth embodiment of the invention.

FIG. 11 is a block diagram showing configuration of a digital camera according to the fourth embodiment. Parts corresponding to those in FIG. 1 are referred to by the same numerals respectively, and description thereof will be omitted. In FIG. 11, a communication portion 19 communicates with another digital camera located in the surrounding, based on short-distance wireless communication (infrared communication, Bluetooth, and so on). Particularly in the fourth embodiment, the communication portion 19 is used for taking an image in cooperation with another digital camera located in the surroundings.

Figure 12A:
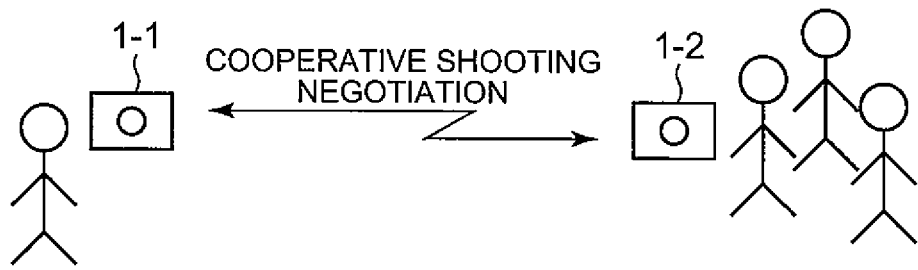
FIGS. 12A to 12E are conceptual views showing a fundamental flow to take a group photo with digital cameras according to the fourth embodiment.
Figure 12B:
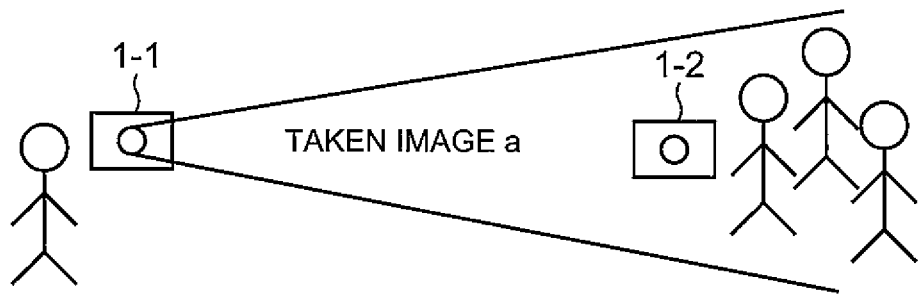
Figure 12C:
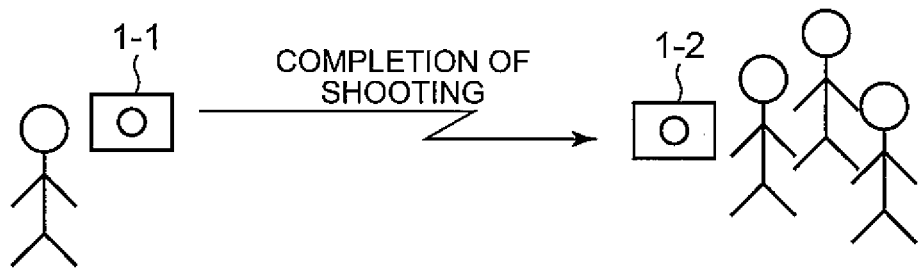
Figure 12D:
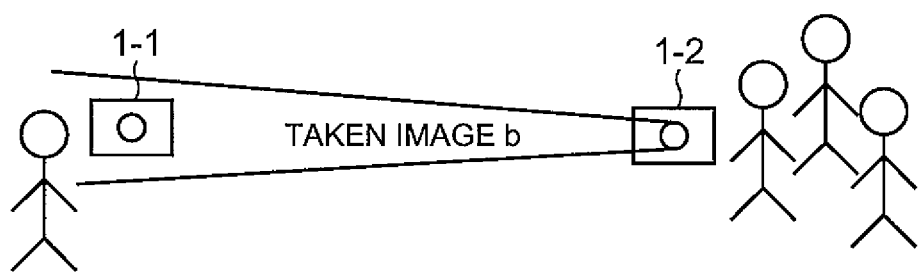
Figure 12E:
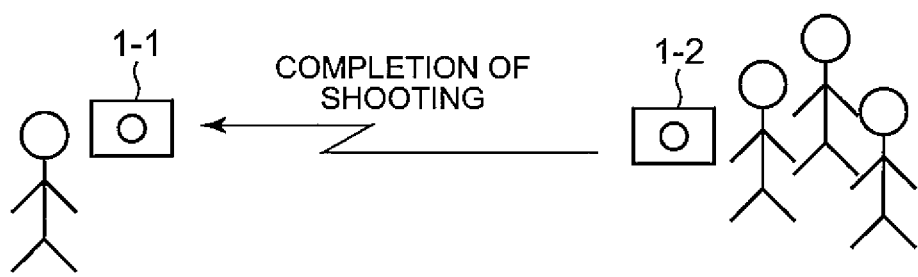

FIGS. 12A to 12E are conceptual views showing a fundamental flow to take a group photo with digital cameras according to the fourth embodiment. First, when an instruction of a cooperative shooting mode is given, the cooperative shooting mode is set between a digital camera 1-1 and a digital camera 1-2 as shown in FIG. 12A. Next, in accordance with a user operation of a photographer, an image a of other photographed persons is taken with the digital camera 1-1 as shown in FIG. 12B, and the digital camera 1-1 notifies the other digital camera 1-2 of completion of the shooting as shown in FIG. 12C. Next, in accordance with a user operation of one of the other photographed persons, an image b of the previous photographer is taken with the digital camera 1-2 which has received the notification indicating completion of the shooting as shown in FIG. 12D, and the digital camera 1-2 notifies the digital camera 1-1 of completion of the shooting as shown in FIG. 12E. That is, the taken images a and b are specified as two taken images shot in series.

After that, the taken image a, b shot with one of the digital cameras 1-1 and 1-2 is transmitted to and received from the other digital camera. When predetermined synthesizing conditions are satisfied, a facial image contained in one of the taken images a and b shot in series in accordance with the user operations performed in series within a predetermined period of time is synthesized with the other taken image so that a new composite image is created. Thus, it is possible to easily synthesize a group photo in which all the persons have been photographed.

In addition, either when the synthesizing conditions are satisfied and synthesizing processing is performed or when the synthesizing processing is not performed, the taken image a and the taken image b shot in series in accordance with the user operations with the digital cameras 1-1 and 1-2 respectively immediately after the instruction of the cooperative shooting mode is given are regarded as relevant so that the taken image a and the taken image b are associated with each other. Here, a method such as addition of a tag to data may be used as the method for associating the taken images. For example, when a photographer takes an image of the photographer after taking a group photo, the two taken images are associated with each other. Thus, the photographer can easily confirm later that the photographer was there at that time.

Figure 13:
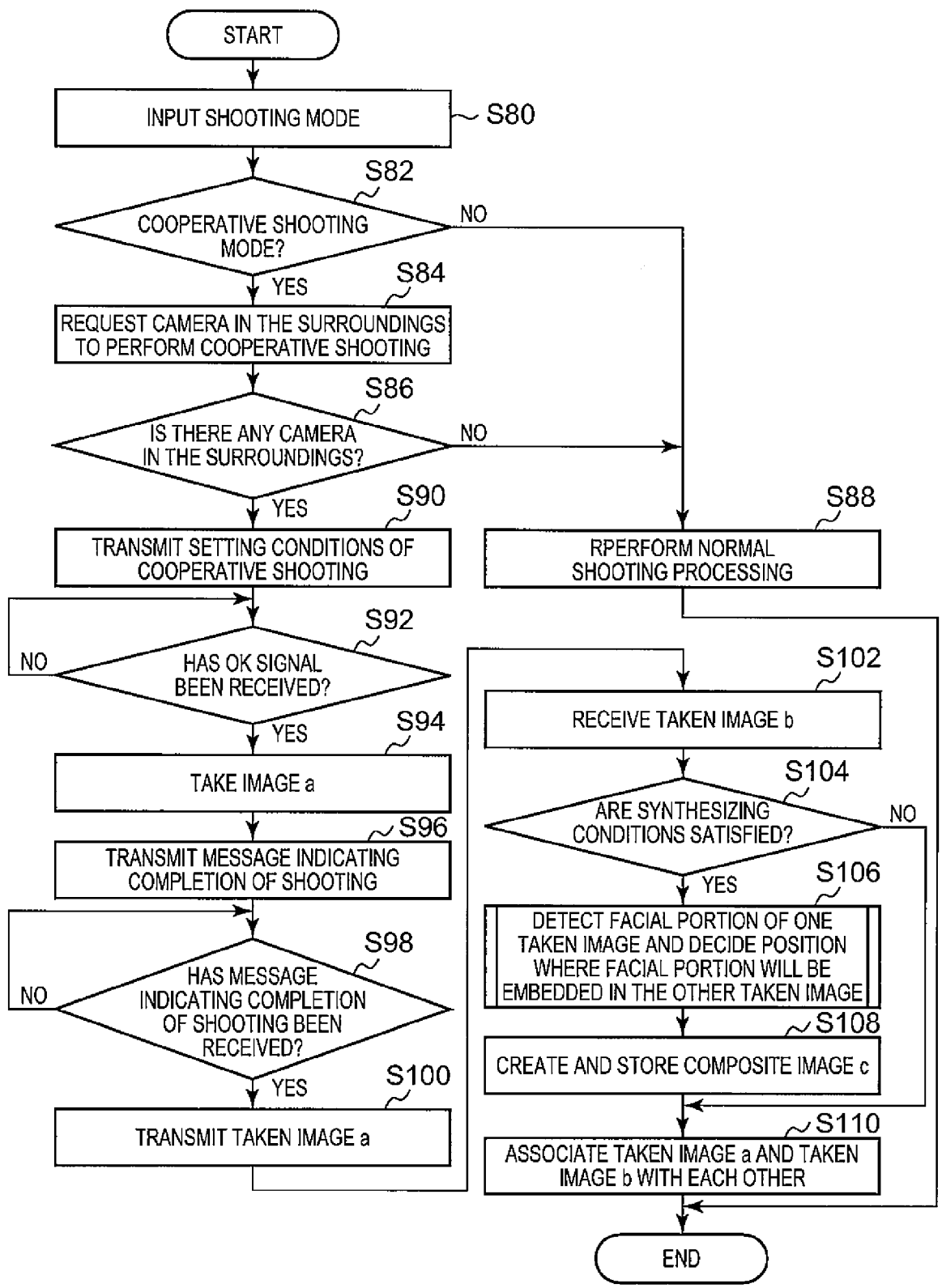
FIG. 13 is a flow chart for explaining operations of the digital cameras according to the fourth embodiment.
Figure 14:
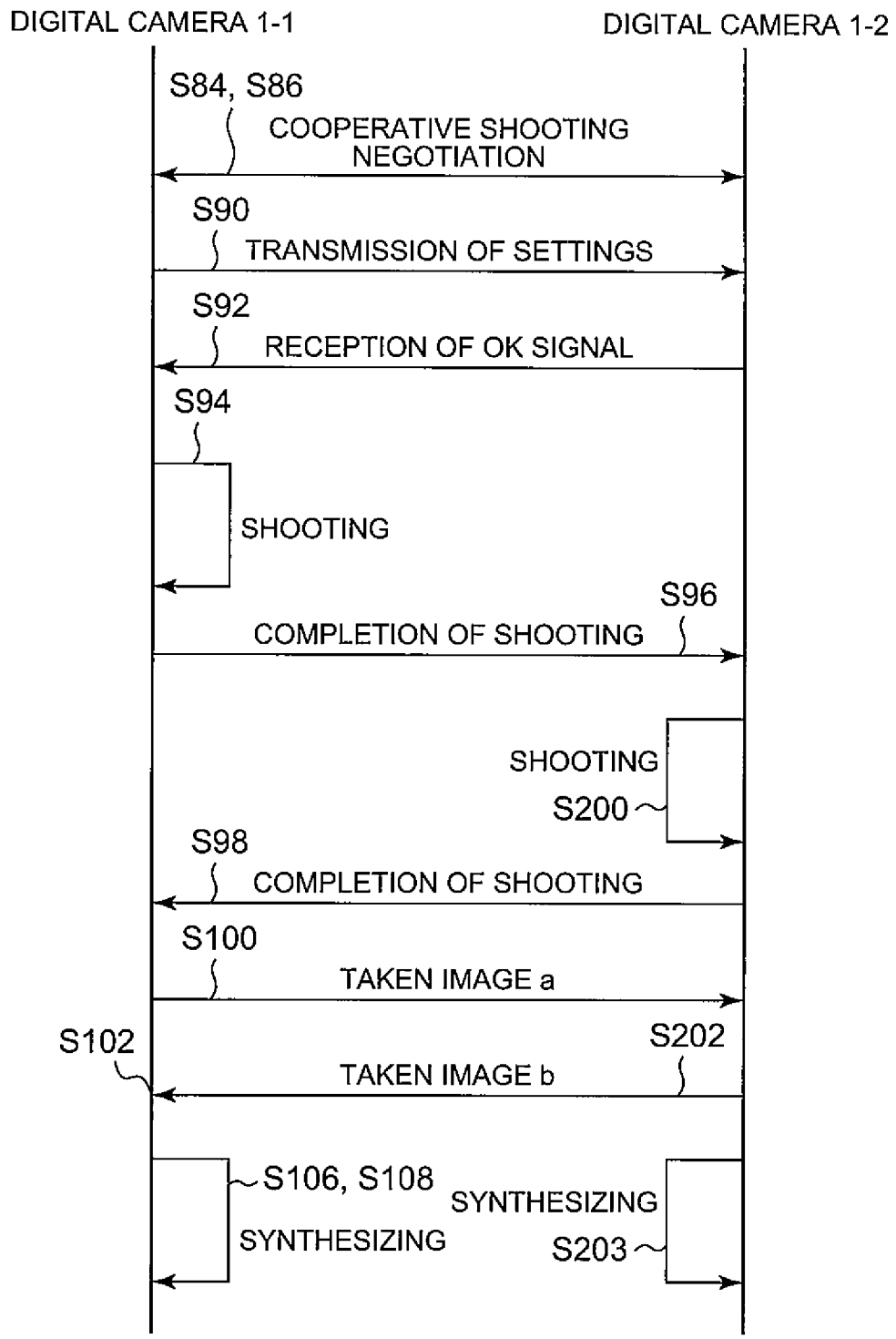
FIG. 14 is a sequence diagram for explaining operations of digital cameras 1-1 and 1-2 according to the fourth embodiment.

FIG. 13 is a flow chart for explaining operations of the digital cameras according to the fourth embodiment. FIG. 14 is a sequence diagram for explaining operations of digital cameras 1-1 and 1-2 according to the fourth embodiment. First, a shooting mode is inputted by a user operation on one of the digital cameras (Step S80). Next, determination is made as to whether the inputted shooting mode is a cooperative shooting mode or not (Step S82). When the inputted shooting mode is not a cooperative shooting mode, determination is made that the shooting mode is another shooting mode, for example, a normal shooting mode, and normal shooting processing is executed (Step S88). After that, the processing is terminated (or returns to Step S80).

On the other hand, when the inputted shooting mode is a cooperative shooting mode, the communication portion 19 uses a predetermined communication method to request a digital camera, which has the same function and may be located in the surroundings, to perform cooperative shooting (Step S84, see FIG. 12A). The other digital camera 1-2 is located around the digital camera 1-1, and the other digital camera 1-2 responds to the request of the cooperative shooting. More specifically, on receiving the request for cooperative shooting, for example, the digital camera 1-2 informs a user by displaying a message indicating the request. The user confirms that the request for cooperative shooting has been received, and gives an instruction through the key input portion 16 or the like as to whether to perform cooperative shooting or not.

Whether the other digital camera 1-2 responds to the request for cooperative shooting from the digital camera 1-1 or not may be determined based on whether setting to respond to the request for cooperative shooting has been made on the digital camera 1-2 in advance or not. Alternatively, ID information of one or more digital cameras which may be paired with the digital camera 1-2 may be registered in advance so that the digital camera 1-2 can respond to only the request for cooperative shooting from each digital camera having a registered ID.

The digital camera 1-1 determines whether there is a response from a digital camera in the surroundings or not, that is, whether a digital camera which can perform cooperative shooting is in the surroundings or not (Step S86). When no digital camera which can perform cooperative shooting is in the surroundings, the digital camera 1-1 determines normal shooting, and executes normal shooting processing (Step S88). After that, the processing is terminated (or returns to Step S80).

On the other hand, when a digital camera which can perform cooperative shooting is in the surroundings (for example, there is a response from the digital camera 1-2), the digital camera 1-1 transmits setting conditions for cooperative shooting to the partner digital camera 1-2 (Step S90). For example, it may be conceived that the setting conditions for the cooperative shooting include which digital camera to perform synthesizing processing, from which digital camera to which digital camera to transmit an image, whether to transmit only a cut-out facial image to the other digital camera in order to reduce the capacity for transmission of the image, whether to transmit the whole of a taken image to the other digital camera, whether to transmit a taken image to a server on a network to perform image synthesizing on the server, etc. The following description will be made in the case where the digital cameras 1-1 and 1-2 exchange taken images for each other and perform image synthesizing.

Next, determination is made as to whether an OK signal indicating that the setting conditions have been confirmed and set has been received from the partner digital camera 1-2 or not (Step S92). When the OK signal has been received, the digital camera 1-1 notifies a user of readiness for shooting on the image display portion 15 or by sound. In accordance with an operation performed on the shutter button by the user who has confirmed the notification, the digital camera 1-1 takes an image a (Step S94, see FIG. 12B). After that, the digital camera 1-1 transmits a message indicating completion of the shooting to the partner digital camera 1-2 (Step S96, see FIG. 12C).

On receiving the message indicating completion of the shooting, the partner digital camera 1-2 notifies a user of readiness for shooting on the image display portion 15 or by sound. In accordance with an operation performed on the shutter button by the user who has confirmed the notification, the digital camera 1-2 takes an image b (see FIG. 12D and Step S200 in FIG. 14). After that, the digital camera 1-2 transmits a message indicating completion of the shooting to the digital camera 1-1 (Step S96, see FIG. 12E).

The digital camera 1-1 determines whether the message indicating completion of the shooting has been received from the partner digital camera 1-2 or not (Step S98). On receiving the message indicating completion of the shooting, the digital camera 1-1 controls the communication portion 19 to transmit the taken image a to the partner digital camera 1-2 (Step S100). The digital camera 1-2 receives the taken image a from the digital camera 1-1. In the same manner, on receiving the taken image a from the digital camera 1-1, the digital camera 1-2 transmits the taken image b to the digital camera 1-1 (see Step S202 in FIG. 14). The digital camera 1-1 receives the taken image b from the partner digital camera 1-2 (Step S102). That is, the taken images a and b are specified as two taken images shot in series.

The digital camera 1-1 determines whether synthesizing conditions are satisfied or not in the same manner as in the aforementioned first embodiment (Step S104). When the synthesizing conditions are satisfied, a facial portion of one taken image (for example, the taken image b) is detected, and a position where the facial portion will be embedded in the other taken image (for example, the taken image a) is determined in order to synthesize the facial portion (Step S106).

Next, the facial portion of the one taken image (for example, the taken image b) is synthesized with the position where the facial portion will be embedded in the other taken image (for example, the taken image a) so that a composite image c is created and stored (Step S108). Next, the taken image a and the taken image b are associated with each other (Step S110). After that, the processing is terminated (or returns to Step S80).

On the other hand, when the synthesizing conditions are not satisfied in Step S106, the taken image a and the taken image b are not subjected to synthesizing processing but associated with each other in Step S110. After that, the processing is terminated (or returns to Step S80).

When setting is made in the setting conditions of the cooperative shooting so as to allow the digital camera 1-2 to perform synthesizing processing, the digital camera 1-2 also synthesizes a facial portion of one taken image (for example, the taken image b) with a position where the facial image will be embedded in the other taken image (for example, the taken image a) as described above so that a composite image c is created and stored. The taken image a and the taken image b are associated with each other, and the processing is terminated (see Step S203 in FIG. 14).

Although the aforementioned fourth embodiment has been described in the case where the digital cameras 1-1 and 1-2 can synthesize images individually, only one of the digital cameras may perform synthesizing processing according to some setting conditions of cooperative shooting or the taken images a and b may be transmitted to a server on a network at a timing desired by a user after the images are exchanged, so that synthesizing processing can be performed on the server.

In addition, in the fourth embodiment, the aforementioned predetermined period of time is a waiting time between the time when the digital camera 1-1 takes an image a while requesting the digital camera 1-2 to perform cooperative shooting and the time when the digital camera 1-2 takes an image b in response to the request for the cooperative shooting. For example, it is assumed that a preparatory time interval before a photographer who performs first shooting puts down a camera and makes a pose after the shooting is in a range of from about one to about ten seconds.

In addition, although the fourth embodiment has been described in the case where the digital camera 1-2 takes the image b in accordance with a user operation, the invention is not limited thereto. Automatic shooting may be performed when a predetermined period of time has passed.

According to the aforementioned fourth embodiment, only when a plurality of persons take images of each other with their own digital cameras respectively, a group photo of the persons including photographers can be easily taken as if the persons were photographed simultaneously with a single camera.

In addition, when synthesizing conditions includes whether to allow only one digital camera to transmit a taken image or whether to transmit only a cut-out facial image to a digital camera which will synthesize the facial image, it is possible to reduce the capacity for transmission of the image. Thus, a group photo of a plurality of persons including photographers can be taken more efficiently and more easily.

What is claimed is:

1. An imaging apparatus comprising:
    an imaging portion that takes images of subjects;
    a first determination portion that, when two taken images taken by the imaging portion are to be synthesized, compares (i) a number of facial images contained in one taken image of the two taken images with (ii) a number of facial images contained in the other taken image of the two taken images, and determines which taken image has a smaller number of facial images; and
    a synthesizing portion that, after the determination by the first determination portion, extracts a facial image from the taken image of the two taken images determined to have the smaller number of facial images, and synthesizes the extracted facial image with a region of the other taken image of the two taken images where there is no facial image.

2. The imaging apparatus according to claim 1, further comprising:
    a second determination portion that determines, as a synthesizing condition, whether or not a facial image which is not smaller than a predetermined size is contained in one taken image, and whether or not a plurality of facial images each of which is not smaller than a predetermined size are contained in another taken image, among two taken images taken by the imaging portion; and
    a control portion that controls the synthesizing portion to synthesize the two taken images when the second determination portion determines that the synthesizing condition is satisfied.

3. An imaging apparatus comprising:
    an imaging portion that takes images of subjects;
    a synthesizing portion that extracts a facial image from one taken image and that synthesizes the extracted facial image with a region of another taken image where there is no facial image, among two taken images taken by the imaging portion;
    a determination portion that determines whether or not members whose facial images are contained in one taken image of the two taken images are different from members whose facial images are contained in the other taken image of the two taken images; and
    a control portion that controls the synthesizing portion to synthesize the two taken images when the determination portion determines that the members whose facial images are contained in the one taken image are different from the members whose facial images are contained in the other taken image.

4. An image synthesizing method in an imaging apparatus comprising an imaging portion for taking images of subjects, the method comprising:
    when two taken images taken by the imaging portion are to be synthesized, comparing a number of facial images contained in one taken image of the two taken images with a number of facial images contained in the other taken image of the two taken images;
    determining which taken image of the two taken images has a smaller number of facial images;
    extracting a facial image from one taken image of the two taken images determined to have the smaller number of facial images; and
    synthesizing the extracted facial image with a region of the other taken image of the two images where there is no facial image.

5. The image synthesizing method according to claim 4, further comprising:
    determining, as a synthesizing condition, whether or not a facial image that is not smaller than a predetermined size is contained in one taken image and whether or not a plurality of facial images each of which is not smaller than a predetermined size are contained in another taken image, among two taken images taken by the imaging portion; and
    synthesizing the two taken images when it is determined that the synthesizing condition is satisfied.

6. An image synthesizing method in an imaging apparatus comprising an imaging portion for taking images of subjects, the method comprising:
    extracting a facial image from one taken image among two taken images shot by the imaging portion;

synthesizing the extracted facial image with a region of the other taken image of the two taken images where there is no facial image; and determining whether or not members whose facial images are contained in one taken image of the two taken images are different from members whose facial images are contained in the other taken image of the two taken images;

wherein the synthesizing is performed when it is determined that the members whose facial images are contained in the one taken image are different from the members whose facial images are contained in the other taken image.

\* \* \* \* \*